(12) United States Patent
Gebhard et al.

(10) Patent No.: US 11,530,633 B2
(45) Date of Patent: Dec. 20, 2022

(54) EFFICIENT GROUNDING OF ELECTRICAL CONNECTION WITH CHALLENGING BONDING PATH

(71) Applicant: Rolls-Royce Corporation, Indianapolis, IN (US)

(72) Inventors: John Gebhard, Fishers, IN (US); Adam Kempers, Indianapolis, IN (US); Jeremy Gallagher, Carmel, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 169 days.

(21) Appl. No.: 16/704,596

(22) Filed: Dec. 5, 2019

(65) Prior Publication Data

US 2021/0172352 A1 Jun. 10, 2021

(51) Int. Cl.
*F01M 11/12* (2006.01)
(52) U.S. Cl.
CPC .................................. *F01M 11/12* (2013.01)
(58) Field of Classification Search
CPC . F01M 11/12; F16N 2210/02; F16N 2210/08; F16N 19/003; B64D 37/32; B64D 45/02; Y02T 50/40; B65D 90/46
See application file for complete search history.

(56) References Cited

U.S. PATENT DOCUMENTS

| | | | | |
|---|---|---|---|---|
| 4,613,922 A | * | 9/1986 | Bachmann | H05F 3/02 361/215 |
| 4,976,146 A | | 12/1990 | Senghaas et al. | |
| 5,159,523 A | * | 10/1992 | Claassen | H05F 3/02 361/216 |
| 5,196,824 A | * | 3/1993 | Helm | G01F 23/68 73/322.5 |
| 5,481,790 A | | 1/1996 | Koreis et al. | |
| 5,514,299 A | * | 5/1996 | Kalwara | B65D 90/46 220/23.87 |
| 5,877,932 A | * | 3/1999 | Hauck | G01M 3/186 361/215 |
| 7,246,640 B2 | * | 7/2007 | Yang | B67D 7/3236 141/94 |

(Continued)

OTHER PUBLICATIONS

Panda, Pravuram et al.; A study on mechanical, thermal, and electrical properties of glass fiber-reinforced epoxy hybrid composites filled with plasma-synthesized AIN; 2014; Journal of Composite Materials; vol. 48(25) (Year: 2014).*

(Continued)

*Primary Examiner* — Kurt Philip Liethen
(74) *Attorney, Agent, or Firm* — Crowell & Moring LLC

(57) ABSTRACT

A system and method of safely servicing a liquid-tight container installed in a location where flammable vapors or electrostatic shock exist, where the structure of the container is fabricated of a non-conductive material. The electrostatic charge build-up inside the container is achieved by coating the inside surface with a dissipative plastic and connecting the dissipative coating to a conductive feed-through with a metallic layer, where at least one of the metallic layer or the conductive layer extends over at least the region between a lower design fill level and an upper design fill level. The conductive feed-through is connected to a system static ground point which is isolated from electronic power supply grounds.

14 Claims, 5 Drawing Sheets

(56) References Cited

U.S. PATENT DOCUMENTS

| | | | | |
|---|---|---|---|---|
| 7,988,086 | B2* | 8/2011 | Tichborne | G01R 31/52 |
| | | | | 324/72 |
| 8,550,403 | B2* | 10/2013 | Yamaguchi | B64C 3/34 |
| | | | | 244/135 R |
| 9,356,399 | B2 | 5/2016 | Leadingham et al. | |
| 9,951,655 | B2 | 4/2018 | Davis et al. | |
| 10,568,193 | B1* | 2/2020 | Chynoweth | H05K 9/0064 |
| 2004/0011129 | A1* | 1/2004 | Gilmour | B60K 15/00 |
| | | | | 73/313 |
| 2004/0146690 | A1* | 7/2004 | Vermillion | B32B 29/00 |
| | | | | 428/323 |
| 2007/0076292 | A1* | 4/2007 | Su | G03F 1/66 |
| | | | | 359/360 |
| 2007/0187552 | A1* | 8/2007 | Tichborne | B64D 45/02 |
| | | | | 244/135 R |
| 2008/0013246 | A1* | 1/2008 | Berenguer Monge | |
| | | | | B65D 90/46 |
| | | | | 361/215 |
| 2009/0071676 | A1* | 3/2009 | Fernandez Vieira | B64D 45/02 |
| | | | | 174/30 |
| 2009/0322147 | A1 | 12/2009 | Cooney | |
| 2011/0114189 | A1* | 5/2011 | Crain | B32B 1/02 |
| | | | | 977/734 |
| 2011/0209894 | A1 | 9/2011 | Williams et al. | |
| 2011/0315818 | A1* | 12/2011 | Chao | B64D 37/32 |
| | | | | 427/372.2 |
| 2012/0012710 | A1* | 1/2012 | Yamaguchi | B64D 37/06 |
| | | | | 244/135 R |
| 2013/0099067 | A1* | 4/2013 | Hansom | B64D 37/32 |
| | | | | 248/56 |
| 2013/0160529 | A1* | 6/2013 | Toxler | G01N 33/2852 |
| | | | | 73/61.43 |
| 2016/0031545 | A1* | 2/2016 | Kamihara | B64D 37/06 |
| | | | | 244/135 R |
| 2017/0001731 | A1* | 1/2017 | Sourbes | B64D 37/005 |
| 2017/0320588 | A1* | 11/2017 | Briand | B64D 37/06 |
| 2018/0220517 | A1* | 8/2018 | Hanlon | H05F 3/02 |
| 2018/0348289 | A1* | 12/2018 | Tillotson | B64D 37/06 |
| 2019/0297716 | A1* | 9/2019 | Scholer | B32B 5/26 |
| 2019/0301645 | A1* | 10/2019 | West | B64D 37/00 |
| 2020/0070998 | A1* | 3/2020 | Ayyadurai | C09D 5/24 |

OTHER PUBLICATIONS

Federal Aviation Administration, DOT, §25.1707, 14 CFR Ch. I (Jan. 1, 2012 Edition), pp. 533-534.

Cooley, William W.; Science & Engineering Associates, Inc., Seattle, Washington; "Determination of Electrical Properties of Grounding, Bonding and Fastening Techniques for Composite Materials", DOT/FAA/CT-86/8; FAA Technical Center, Atlantic City International Airport, N.J. 08405; Apr. 1987, Final Report; 85 pages.

* cited by examiner

EFFICIENT GROUNDING OF ELECTRICAL CONNECTION WITH CHALLENGING BONDING PATH

TECHNICAL FIELD

This disclosure relates the grounding of a composite material tank for containing a liquid and having electronic equipment inside.

BACKGROUND

Vehicles, including cars and airplanes, continue to use increasing quantities of composite materials, for structural reasons and to take advantage of the comparably lower weight to perform the same function with respect to a metal version of the same component. This does not suggest that the materials are interchangeable without consideration of the particular differences in the physical attributes of each.

Fluid containers, vessels, reservoirs, or tanks may be used, for example to supply oil, fuel or other liquids to various components of an engine. To achieve the necessary liquid volume while conforming to other design requirements of the engine or other associated system, the containers may be formed in unconventional shapes so as to permit installation in confined and possibly inaccessible locations in a system. Such access may require substantial disassembly of the system in which the tank is installed. An example of such an application is in a gas turbine engine. A liquid container may fabricated from composite materials such as a resin-impregnated carbon fiber, Kevlar or the like, and the strength member, and may be installed in locations that might be inaccessible for routine servicing. Such containers may have remote sensing capabilities to monitor the fill level and other properties of the stored liquid and to control or guide the refilling of the container to account for consumption of the liquid in use.

Design considerations for such containers and electronics to be used with the container to measure liquid levels, for example, may depend on the nature of the liquid that is contained, where lubricating oil and jet fuel, for example, have substantially different flash points and other chemical properties. Additionally, when used in conjunction with a gas turbine engine in an aircraft, specific grounding and bonding requirements are mandated by regulation where 14 CFR § 25.1707 (d) (1) requires that airplane independent electrical power sources must not share a common ground terminating location; and, (2) airplane system static grounds must not share a common ground terminating location with any of the airplane's independent electrical power sources.

Gas turbine engines may include a compressor, a combustor, and a turbine. Typically, the compressor is an air compressor rotating on a longitudinal shaft of the engine to provide air for the combustion cycle. The air is provided to the combustor along with fuel where combustion occurs to create a high pressure, high temperature flow, which is provided to the turbine. The turbine may provide mechanical torque to the shaft and provides exhaust gas that creates thrust. The gas turbine engine typically includes bearings, such as shaft bearings that allow the shaft to rotate. Such bearings may be lubricated by bearing oil. The bearing oil may be distributed to one or more bearings from an oil pump(s). Seals may be used to stop leaking of the bearing oil around the shaft or other rotating parts of the gas turbine engine. An oil scavenge system may return bearing oil from the oil sump(s).

The location and cross-section and overall configuration of such an oil tank may be constrained by the geometry of the turbine engine, compressor and associated air guiding structures. These requirements may further complicate the design of an electrical system as the location of the nearest static ground point may necessitate use of a long flexible grounding strap. This may be undesirable due to dynamic, mechanical, and wear considerations.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In an example, the vessel may be an oil reservoir, or tank that is located between an inner portion of a fan duct and the outer housing of the turbine portion of a gas turbine engine. Other locations are not intended to be excluded. The location of the oil reservoir may be constrained by the other aspects of the engine design such that direct access to the oil reservoir, the addition of oil or the measurement of the quantity of oil in the tank is either difficult, or not feasible, without at least partial disassembly of the engine. In some instances, access may be provided by panels that can be opened for servicing; however, when the measured quantity of oil is at a satisfactory level, avoiding such maintenance actions reduces cost.

Oil may be added to the reservoir using a filler pipe or pressurized oil supply to make up for oil consumed during operation, depending on the specific design. To do this, the level of oil in the reservoir needs to be determined, and the oil re-supply operation should not result in overfilling of the reservoir. The use of grounding techniques as described herein is not limited to an oil tank, but may be used for other liquid containers where grounding and bonding requirements are design considerations.

In an example, the oil reservoir may be formed with a pair of arcuate opposing sides so as to increase the angular length of the oil reservoir when the reservoir is located, for example, to approximately conform with the radius of curvature of an interior part of the engine assembly.

Figure 1:
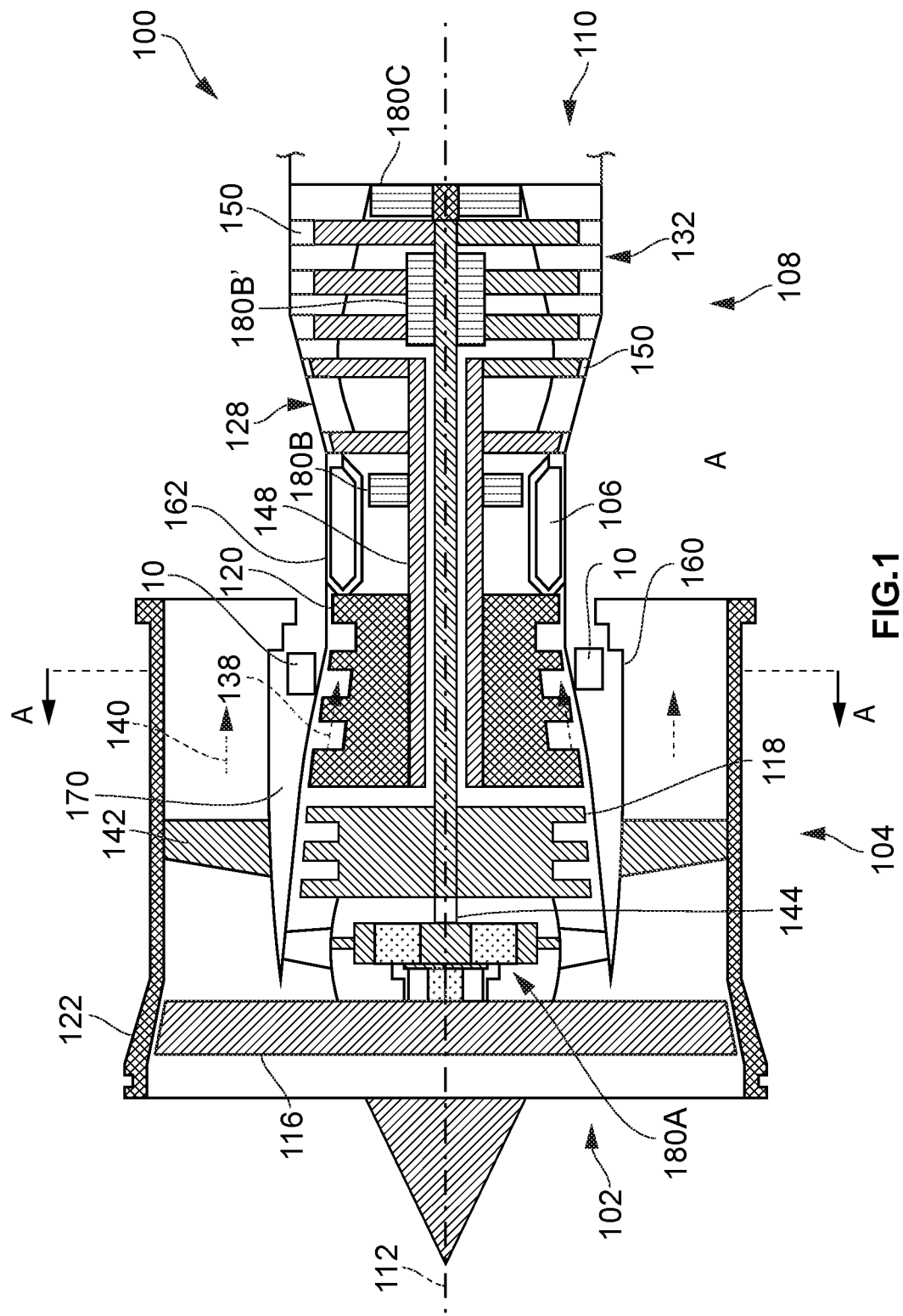
FIG. 1 illustrates a longitudinal cross-sectional view of an example of a gas turbine engine, with an example location of a liquid reservoir.

FIG. 1 is a cross-sectional view of an example of a gas turbine engine 100. The gas turbine engine 100 may, for example, supply power to or provide propulsion of an aircraft and for ancillary equipment. Examples of such aircraft may include a helicopter, an airplane, an unmanned space vehicle, a fixed wing vehicle, a variable wing vehicle, a rotary wing vehicle or the like. In other examples, the gas turbine engine 100 may be utilized in a configuration unrelated to an aircraft such as, for example, an industrial application, an electrical energy application, a standby power plant, a pumping set, a marine application (for example, for naval propulsion), a weapon system, a security system, a perimeter defense or security system, or the like.

The gas turbine engine 100 may take a variety of forms in various embodiments. Although depicted in the example of FIG. 1 as a ducted axial-flow engine with multiple spools, in some forms the gas turbine engine 100 may have additional or fewer spools or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated. Other engine types may also employ a liquid tank where remote subject to grounding and bonding design requirements.

The gas turbine engine 100 may include an air intake 102, multistage axial-flow compressor 104, a combustor 106, a multistage turbine 108 and an exhaust 110 concentric with a central axis 112 of the gas turbine engine 100. The multistage axial-flow compressor 104 may include a fan 116, a low-pressure compressor 118 and a high-pressure compressor 120 disposed in a fan casing 122. The multistage turbine 108 may include a high pressure turbine 128 and a low pressure turbine 132.

A low-pressure spool includes the fan 116 and the low-pressure compressor 118 driving the low-pressure turbine 132 via a low-pressure shaft 144. A high-pressure spool includes the high-pressure compressor 120 driving the high-pressure turbine 128 via a high-pressure shaft 148. In the illustrated example, the low-pressure shaft 144 and the high pressure shaft 148 are disposed concentrically in the gas turbine engine 100. Other shaft configurations are possible.

During operation of the gas turbine engine 100, external air received from the air intake 102, such as air, is accelerated by the fan 116 to produce two air flows. A first air flow, or core air flow, travels along a first flow path indicated by dashed arrow 138 in a core of the gas turbine engine 100. The core is formed by the multi-stage axial compressor 104, the combustor 106, the multi-stage turbine 108 and the exhaust 110. A second air flow, or bypass airflow, travels along a second flow path indicated by dashed arrow 140 outside the core of the gas turbine engine 100 past outer guide vanes 142.

The first air flow, or core air flow, may be compressed within the multi-stage axial compressor 104. The compressed liquid may then be mixed with fuel and the mixture may be burned in the combustor 106. The combustor 106 may include any suitable fuel injection and combustion mechanisms. The resultant hot, expanded high-pressure liquid may then pass through the multi-stage turbine 108 to extract energy from the liquid and cause the low-pressure shaft 144 and the high-pressure shaft 148 to rotate, which in turn drives the fan 116, the low-pressure compressor 118 and the high-pressure compressor 120. Discharge liquid may exit the exhaust 110.

The first air flow 138 and the second air flow 140 are coaxial and are confined and separated from each other by a structure comprising the fan casing 122 and an outer compressor case 160 and the outer case 162 of the multi-stage compressor 118,120. A void 170 may exist between the outer compressor case 160 and the outer case 162 where auxiliary equipment such as an oil reservoir 10, shown in longitudinal cross section, may be provided, using this otherwise empty space.

Figure 2:
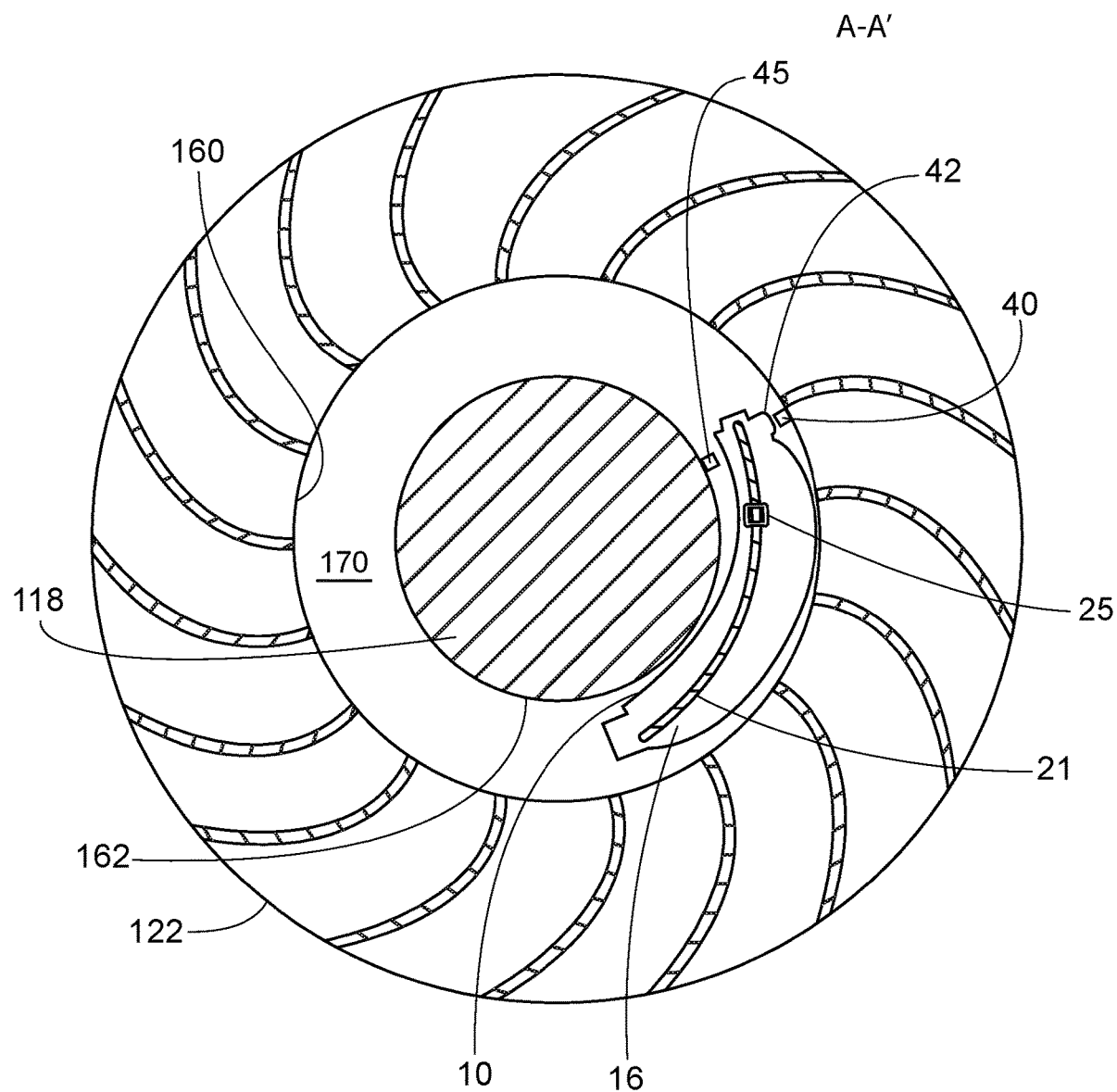
FIG. 2 is a simplified transverse cross-section view (looking forward) of a portion of an example gas turbine engine of FIG. 1 illustrating the example location of the liquid reservoir.

In an aspect, FIG. 2 is a simplified cross-sectional transverse view (looking forward) of a portion of an example gas turbine engine of FIG. 1, which is a non-limiting example illustrating the location of the oil reservoir 10 with respect to the outer compressor case 160 and the outer case 162 of the engine core, which may the multi-stage compressor or high pressure turbine 118. In this example, the oil reservoir 10 is disposed along an arcuate side portion of the void 170 created by the walls 160 and 162. Details of the mounting arrangement are not shown as they depend on the engine specific design. However, the oil reservoir 10 may be fixedly attached to a wall 160 or 162 or other structural element of the airframe.

The reservoir 10 may comprise arcuate surfaces opposing the walls 160 and 162 where the radius of curvature of the walls of the reservoir are selected to conform to the general radius of curvature of the void 170, facilitating installation of a reservoir of a desired capacity in a confined space. The radius of curvature may vary as part of the detailed design of the oil reservoir 10, taking into account the required liquid volume, the shape of the oil measurement device 15, mounting and liquid feeding arrangements and other incidental components and attachment points. An electronic sensing assembly 20 may be installed in the oil reservoir 10 to measure a characteristic of the liquid that may be contained therein.

Figure 3A:
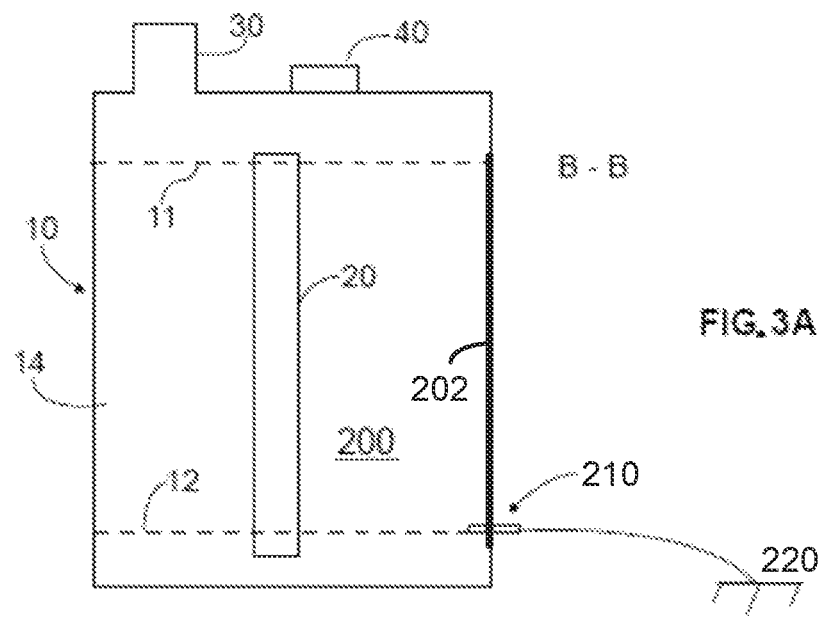
FIG. 3A is a simplified elevation cross-section view at B-B of a liquid reservoir suitable for mounting in the location shown in FIG. 2.
Figure 3B:
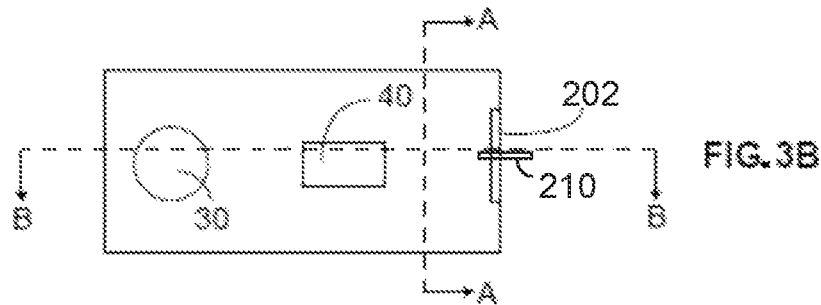
FIG. 3B is a top view of the liquid reservoir of FIG. 3B.
Figure 3C:
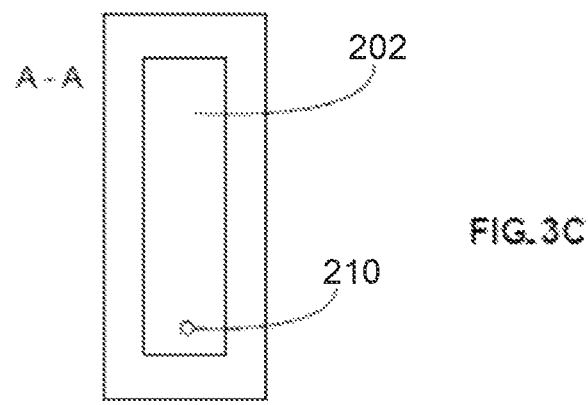
FIG. 3C is an elevation cross section at A-A of a side of the liquid reservoir of FIG. 3A and FIG. 3B.

As shown in FIG. 3A-C, the walls, the top and the bottom surfaces may be fabricated from non-conductive composite materials forming a closed volume that may be accessed through a filler tube 30 fitted with a liquid-tight closure (not shown). Electrical connections such as power and data may interface with the reservoir 10 through an interface unit 40, where electronics for power and signal conditioning may reside, and forming a liquid-tight penetration of the reservoir 10 to connect with an oil level sensor 20.

FIG. 3A shows an elevation view of a cross-section of a reservoir, which may also be termed a tank, reservoir or similar term. The arcuate dimensions and possible asymmetrical cross section shown in FIG. 2 are simplified in this depiction to a conventional rectangular cross-section in order to focus on specific aspects of the present disclosure. While a tank with a complex geometrical shape may be needed in the specific embodiment of the engine shown, the disclosed approach to grounding and bonding may be used for a tank of any size or shape that is fabricated in the whole, or in part, of a composite material.

The tank 10 may be fully enclosed so as to prevent liquid or vaporized oil or fuel from escaping and contaminants from entering. The walls, top and bottom surfaces may be fabricated as a non-conductive composite material forming a closed volume that may be accessed through a filler tube 30 fitted with a gas-tight closure. Electrical connections such a power and data may interface with the reservoir through an interface unit 40, where electronics for power and signal conditioning may reside, and forming a liquid-tight penetration of the reservoir 10 to connect with the oil level sensor 20. Alternatively, the electronics for power and signal conditioning for the sensor may be located, at least in part, within the tank 10.

An upper 11 and a lower 12 liquid level are shown, being the design limits of a particular embodiment, and the oil level sensor 20 may extend over at least the full range of levels that are intended to be monitored.

The conductivity of oil or fuel is significantly lower than that of metals, and the particular numerical value may vary depending on the specific chemical composition and on any additives and contaminants that arise from the use of the liquid over time. In an aircraft, any such liquid is subject to having the surface thereof perturbed by the motion of the aircraft, by turbulence, or the like and this may result in significant triboelectric charging of the surface. This may result in a charge imbalance of the non-conductive walls with respect to the surface of the liquid and with respect to the exterior environment. Providing that sharp edges are avoided on the oil gauge and other interior features, static discharge during operation may be unlikely. In the case of oil, such a discharge would likely be self-quenching due to the high flash point of the liquid vapor. A fuel, having a lower flash point may dictate more care in design. Electrostatic charging has significantly different physical manifestations when compared with the differential voltages encountered in conventional conductive electric circuits.

The charge imbalance interior to the reservoir 10 cannot be dissipated by an external ground connection, and may exist between surfaces having insulating properties. The low conductivity of typical composite materials may result in the internal charge imbalance being present for an extended period of time after the triboelectric charging event. However, when the reservoir 10 is being refilled through the orifice 30, a path between the exterior environment and the surface of the liquid exists or the surface of the container above the liquid. Personnel handling a filling device need to be protected against the effects of the static discharge. Even if the amount of charge is small from an electrical shock viewpoint, personnel may be startled and lose their balance in circumstances where physical injury may occur. Even if a high-flash-point liquid is in the tank, the exterior environment may be one where low-flash point liquids such as jet fuel may be in proximity and where a spark could ignite the vapors.

A static discharge path to the exterior environment and FIG. 3C is needed both with respect to a system or aircraft static ground, and with respect to a filling container brought into close proximity with the reservoir 10 for purposes of adding liquid thereto. The latter may be achieved by connecting (bonding) the filling container to the system ground 220 or by connecting a ground of the filling container to a system ground 220 on the reservoir exterior.

The reservoir may have wall 14 fabricated from a composite material such as carbon fiber or Kevlar consolidated by a cured resin and having mechanical properties suitable for this application, including resistance to hydrocarbon solvents and chemical additives that may be present in the oil or fuel. However, the resistivity (both bulk and surface resistivity) of these materials may be quite high and be conducive to build up of charge on the surfaces thereof, which may not be immediately dissipated due to the very poor conductivity of the material. Materials such as Kevlar as insulators may have particularly poor static dissipative qualities. Charge build-ups may last for hours or more and constitute at least a personnel hazard when manually re-filling the reservoir. Protection against such potential differences is needed both with respect to the local ground environment and with respect to the filling apparatus.

Figure 4A:
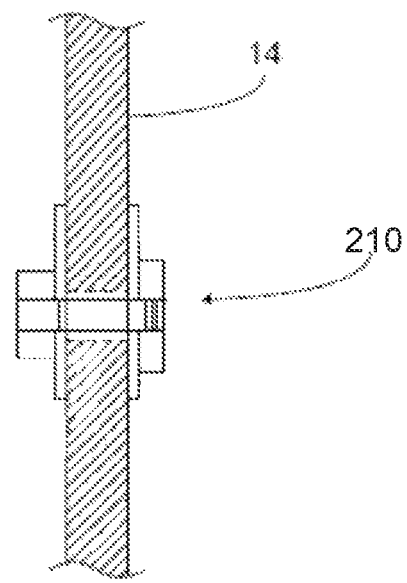
FIG. 4A is a cross sectional view of a wall of the liquid reservoir of FIGS. 3A-3C showing a liquid-tight electrical-ground-feed-through terminal.
Figure 4B:
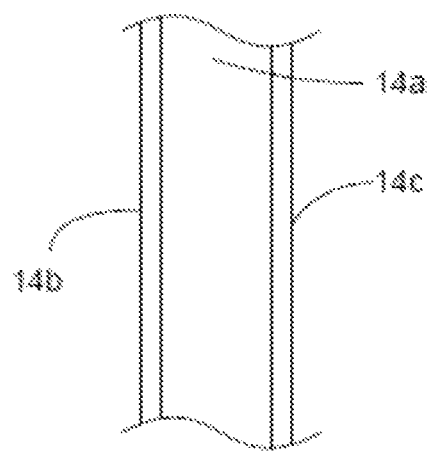
FIG. 4B is a detail of the construction of the wall of FIG. 4A.

Composite materials with suitable properties are available. As shown in FIG. 4A-B however, coating the inner surface 14b and outer surface 14c of the strength member 14a of the wall 14 of the reservoir 10 with dissipative plastic coatings that are resistant to solvents and chemicals is an alternative, so that the selection of materials for the structural composite material 14a may be broadened. Such materials may include, for example, a ceramic matrix composite (CMC), carbon fiber, or ceramic material, which may be lighter in weight than traditional materials such as aluminum and steel. The surface resistivity of the coatings should be in the range $10^6$-$10^{12}$ ohms/sq., although conductive metal films may also be used. The surface resistivity of typical materials used for the strength member 14a such as Kevlar or glass fiber in an epoxy matrix in the range of $10^{14}$-$10^{18}$ ohms/sq. Typically the conductivity of a dissipative coating is 3 or more time the conductivity of the non-conductive composite material The dissipative plastic coating 14b may overlay or underlay a conductive layer, or foil liner 202 having a conductivity typical of a metal plating layer and this conductive layer 202 is in contact with a conductive feed through 210 providing a liquid-tight penetration of the container 10. This may have the benefit of providing a large contact area between the inner strength member, the liquid 200 and a metallic feed through assembly 210 such as shown in FIG. 4. Connecting the bulk liquid 200 and the surfaces that may accumulate an electrostatic charge to the outside environment using a conductive feed through is part of the protection static electricity grounding scheme to ensure that the inner surface 16 of the container 10 and the liquid 200 maintains effective contact with the external static ground 220 by a cable (not shown) connected to the outer conductive portion of the conductive feed-through 210.

When the foil liner 202 is disposed underneath the dissipative plastic coating 14b on the inside surface of the container 10, the ability of the dissipative plastic coating to resist deterioration by the liquid 200 may improve the lifetime of the container 10. At least one of the foil liner 202 or the dissipative plastic coating 14b should extend above the height of the maximum fill level, and either of the foil liner 202 or the dissipative plastic coating 14b may cover the entire inside surface 16 of the container 10.

The feed-through assembly 210 may be located at a location on the reservoir 10 that is convenient for connecting to the system ground terminal point with the most appropriate ground cable routing. The foil liner 202 may extend over a length of a side of the reservoir from at least the lower fill level to at least the upper fill level. Some benefit may be achieved by extending the foil liner 202 to the bottom surface so that protection is enhanced during initial fill operations. The dissipative coating 14b should extend at least over the range of heights of the liquid between the lower fill design limit and sufficiently above the upper fill design limit to discharge static electricity associated with the liquid sloshing around in the tank.

The outer surface of the tank 10 may be coated with a dissipative layer 14c and be connected to the outer portion of the conductive feed through 210 (not shown) through a foil layer contacting the dissipative coating and the feed through 210. However, triboelectric charging is less of a concern with the outside surface where there is no liquid or particulate material making contact with the dielectric material, and this may be omitted.

The location of the feed-through assembly 210 on the container may be selected so as to minimize the physical distance between the feed-through assembly and the system static ground connection point, or other location so as facilitate the installation, servicing and use of the container.

Figure 5:
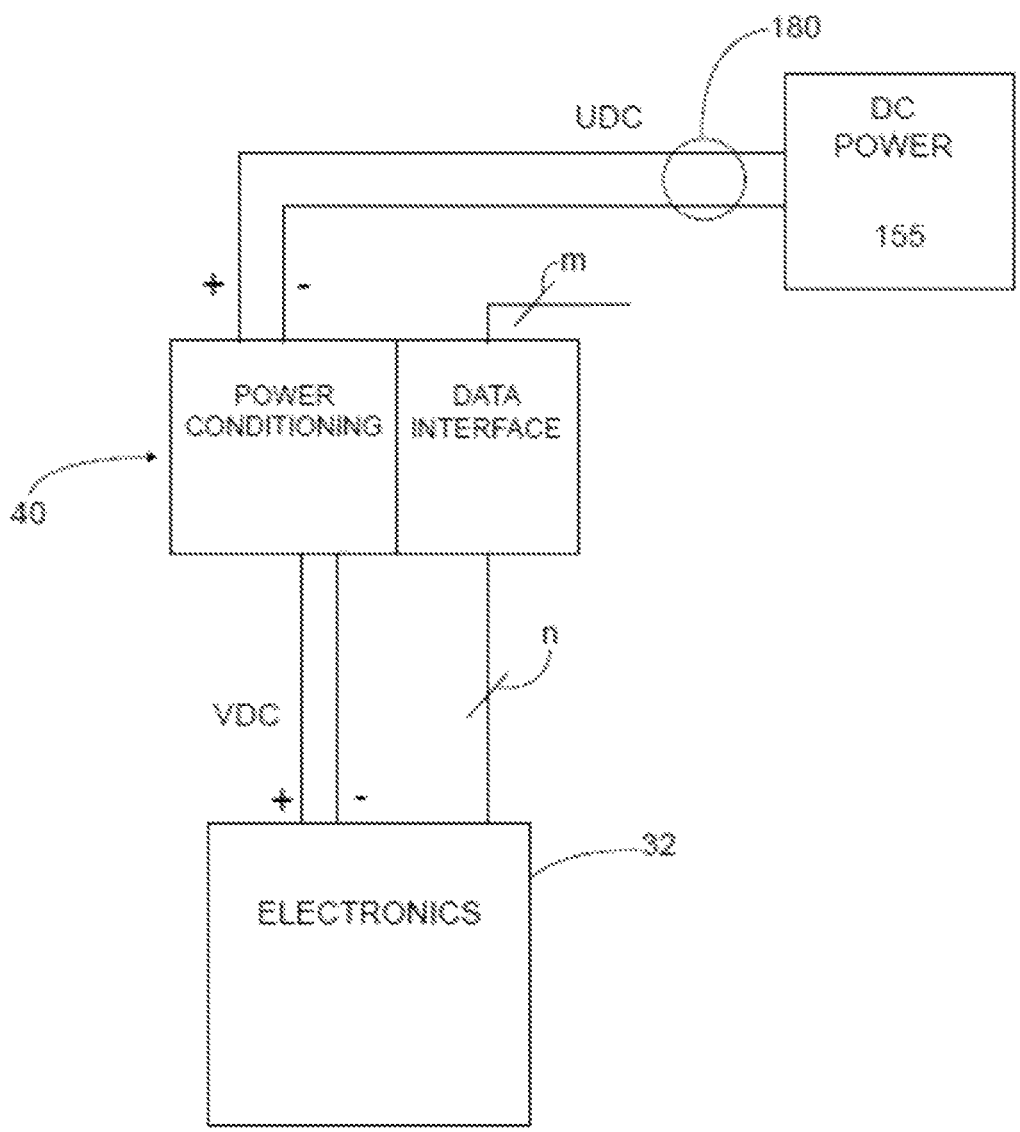
FIG. 5 is a schematic electrical block diagram of a liquid monitoring device, including the power supply and data interface aspects.

Electronic assemblies 32 may be located either in association with the sensor 20 or with the electrical interface (interface unit 40) to the tank 10. The power requirements of such devices is provided by either AC or DC power supplies meeting the requirement that the electrical power ground be isolated from the static ground. The selection of a power source for electronics having nominal power supply requirement may be any of 115 VAC (400 Hz), 26 VAC (nominal) or 24 VDC, which are typical aircraft power supply characteristics, so long as the ground return is associated with the power source and not with the static ground system. An example of such a power supply and data communications arrangement using a DC power supply 155 is shown in FIG. 5. A data interface 560 for control and readout of the electronics (the electronic assembly 32) may be any of the known, or to be developed, interface protocols so long as the characteristics of the circuits conform to the electronic grounding requirements.

Static electricity is a pervasive problem in design of liquid containers made from insulating materials and overdesign of the arrangement for dissipating static electricity charge is more preferable than a marginal design since the quantitative aspects of static electricity build up and discharge are less well characterized by conventional engineering principals. The selection of materials is governed by numerous materials-related requirements, such as resistance to chemicals, abrasion, physical strength, flexibility or the like. It is the ability of the coatings and the connections to the surface of the liquid and the surfaces of the container to rapidly discharge the electrostatic potential that is important. The large differences in the relative resistivities of the composite material strength member, the dissipative coating and the metallic layer connecting to the static ground feed through make an opportunity to select materials primarily for their mechanical and other physical characteristics, while affording adequate protection against electrical discharge.

The subject-matter of the disclosure may also relate, among others, to the following:

1. In an aspect, a liquid-tight container, comprises:
    a volume enclosed by a non-conductive composite-material strength member;
    a filler aperture;
    an interface for power and communications with an electronics assembly within the liquid-tight container; and
    a first static ground feed-through located to penetrate a wall of the liquid-tight container,
    wherein, an inner surface of the liquid-tight container is coated with a first dissipative coating and connected to the first static ground feed-through by a metallic layer.
2. The container of aspect 1, wherein a surface resistivity of the first dissipative coating is at least about three orders of magnitude less than that of the non-conductive composite-material strength member.
3. The container of aspect 1, wherein the non-conductive composite-material strength member is comprised of a fiber having a high tensile strength such as Kevlar or epoxy embedded in a carbon matrix.
4. The container of aspect 1, wherein a location of the first static ground feed-through on the container is selected to minimize a physical length of a cable connecting the first static ground feed-through to an external static ground connection.
5. The container of aspect 1, wherein a ground of the electronics assembly is isolated from an external static ground.
6. The container of aspect 1, wherein at least one of the metallic layer or the first dissipative coating extends over a height range including a lower design liquid level and an upper design liquid level.
7. The container of aspect 1, further comprising:
    a second dissipative coating on an outer surface of the liquid-tight container connected to the static ground feed-through by a second metallic layer.
8. The container of aspect 7, wherein the first dissipative coating on the outer surface of the liquid-tight and the second dissipative coating on the inner surface of the liquid-tight container are different materials.
9. The container of aspect 1, wherein a second static ground feed-through is provided in a position accessible while adding liquid to the container, and connected to the first dissipative coating by the metallic layer.
10. The container of aspect 9, wherein the metallic layer connecting to the second static ground feed-through is not a same layer as the metallic layer connecting to the first static ground feed-through.
11. The container of aspect 1, wherein a surface resistivity of the dissipative coating is between about $10^6$-$10^{12}$ ohms/sq. and a surface resistivity of the non-conductive composite material is between $10^{14}$-$10^{18}$ ohms/sq.
12. In an aspect, a method of preventing electrostatic discharge in a liquid-tight container, the method comprises:
    providing a non-conductive composite material forming a liquid-tight volume;
    coating an interior surface of the liquid-tight volume with a dissipative layer;
    applying a metallic layer of to the interior surface of the liquid-tight volume;
    providing a first static ground feed-through in the a wall of the liquid-light volume; and
    connecting the metallic layer to the first static ground feed-through.
13. The method of aspect 12, wherein a surface resistivity of the dissipative layer is at least about three orders of magnitude less than a surface resistivity of the non-conductive composite material.
14. The method of aspect 13, wherein the surface resistivity of the dissipative layer is between $10^6$-$10^{12}$ ohms/sq. and the surface resistivity of the non-conductive composite material is between. $10^{14}$-$10^{18}$.ohms/sq.
15. The method of aspect 12, further comprising providing a liquid-tight interface for power and communications to an electronics module inside the liquid-tight liquid container.
16. The method of aspect 15, further comprising a second static ground feed-through connected to the metallic layer.
17. The method of aspect 16, wherein there is no electrical connection between the liquid-tight interface and either the first static ground feed-through or the second static-ground feed through.
18. In an aspect, a method of servicing a non-conductive liquid-tight container, comprises:
    providing the non-conductive liquid-tight container, further comprising an interior dissipative coating connecting to a first static ground feed-through;
    installing the non-conductive liquid-tight container in conjunction with an engine and providing a connection from the non-conductive liquid-tight container to an external system static ground;

providing a power supply ground connection isolated from the external system static ground;

providing a second static ground feed-through connected to the interior dissipative coating;

and connecting a bonding electrical cable between the second static ground feed-through and a ground terminal on a vessel containing liquid to be introduced into the non-conductive liquid-tight container prior to opening a orifice in the non-conductive liquid-tight container.

19. The method of aspect 18, wherein the non-conductive liquid-tight container is an oil tank of a turbine engine.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A liquid-tight container, comprising:
a non-conductive composite-material strength member enclosing a volume;
a filler aperture;
an interface for power and communications with an electronics assembly, the electronics assembly located within the liquid-tight container;
a static ground feed-through located to penetrate a wall of the liquid-tight container in a location different from the filler aperture;
a dissipative coating coated on an inner surface of the liquid-tight container; and
a metallic layer overlaying the dissipative coating on the inner surface of the liquid-tight container, the metallic layer connecting the dissipative coating to the static ground feed-through.

2. The container of claim 1, wherein a surface resistivity of the dissipative coating is at least three orders of magnitude less than that of the non-conductive composite-material strength member.

3. The container of claim 1, wherein the non-conductive composite-material strength member is comprised of a fiber embedded in a carbon matrix.

4. The container of claim 1, wherein a location of the static ground feed-through on the container is selected to minimize a physical length of a cable connecting the static ground feed-through to an external static ground connection.

5. The container of claim 1, wherein a ground of the electronics assembly is isolated from an external static ground.

6. The container of claim 1, wherein at least one of the metallic layer or the dissipative coating extends over a height range including a lower design liquid level and an upper design liquid level.

7. The container of claim 1, wherein the dissipative coating is a first dissipative coating, the container further comprising: a second dissipative coating on an outer surface of the liquid-tight container.

8. The container of claim 7, wherein the second dissipative coating on the outer surface of the liquid-tight container and the first dissipative coating on the inner surface of the liquid-tight container are different materials.

9. The container of claim 1, wherein a surface resistivity of the dissipative coating is between $10^6$-$10^{12}$ ohms/sq. and a surface resistivity of the non-conductive composite material is between $10^{14}$-$10^{18}$ ohms/sq.

10. A method of preventing electrostatic discharge in a liquid-tight container, the method comprising:
providing a non-conductive composite material forming a liquid-tight volume;
coating an interior surface of the liquid-tight volume with a dissipative layer;
applying a metallic layer to the interior surface of the liquid-tight volume;
providing a first static ground feed-through in a wall of the liquid-tight volume in a location different from a filler aperture of the liquid-tight container; and
connecting the metallic layer to the first static ground feed-through.

11. The method of claim 10, wherein a surface resistivity of the dissipative layer is at least three orders of magnitude less than a surface resistivity of the non-conductive composite material.

12. The method of claim 11, wherein the surface resistivity of the dissipative layer is between $10^6$-$10^{12}$ ohms/sq. and the surface resistivity of the non-conductive composite material is between $10^{14}$-$10^{18}$ ohms/sq.

13. The method of claim 10, further comprising providing a liquid-tight interface for power and communications to an electronics module inside the liquid-tight liquid container.

14. The method of claim 13, wherein there is no electrical connection between the liquid-tight interface and either the first static ground feed-through.

* * * * *